Aug. 17, 1965 W. E. SHOWALTER 3,201,197
PREPARATION OF HYDROGEN CLAYS
Filed June 25, 1962
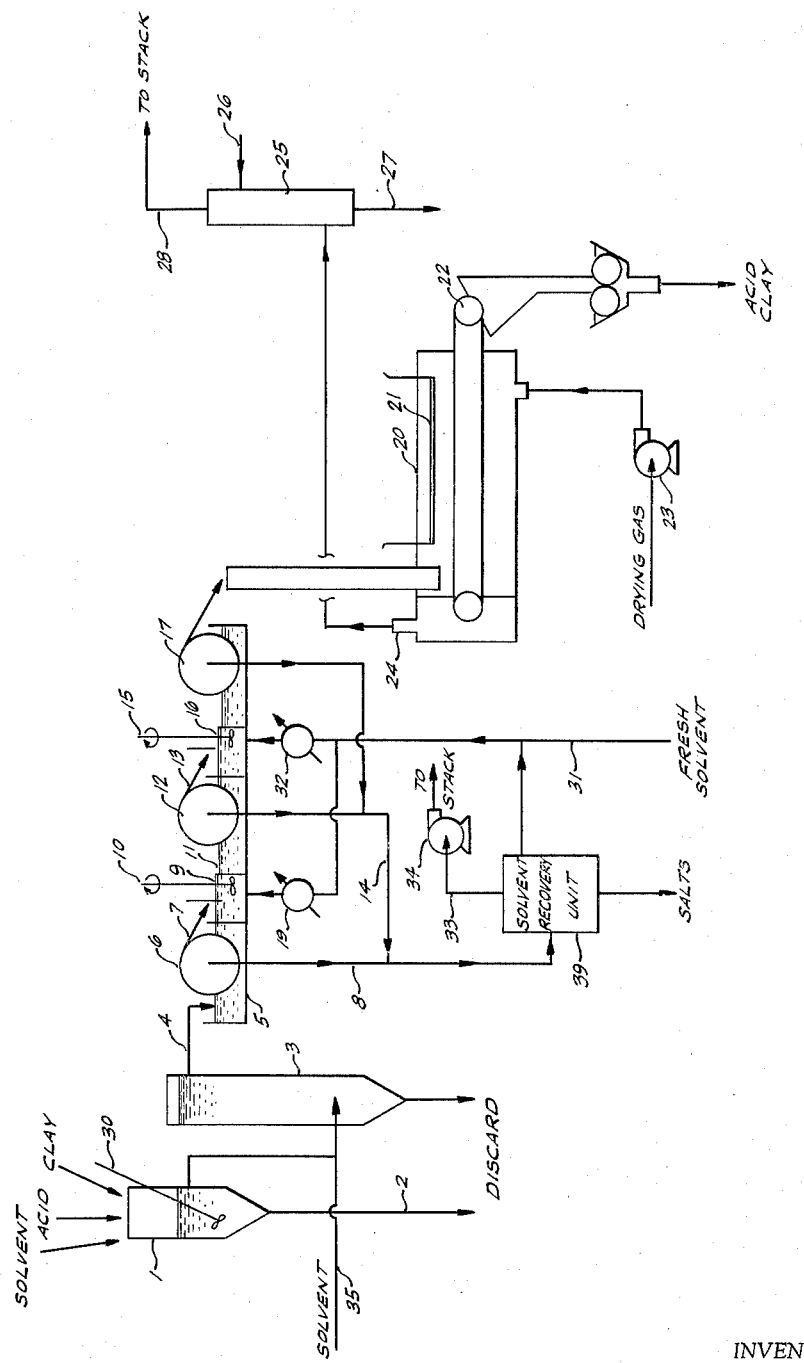
INVENTOR.
WILLIAM E. SHOWALTER
BY
ATTORNEY

United States Patent Office 3,201,197
Patented Aug. 17, 1965

3,201,197
PREPARATION OF HYDROGEN CLAYS
William E. Showalter, Seal Beach, Calif., assignor to Union Oil Company of California, Los Angeles, Calif., a corporation of California
Filed June 25, 1962, Ser. No. 204,748
8 Claims. (Cl. 23—112)

This invention relates to the preparation of hydrogen clays, i.e., clays having their ion-exchange sites occupied by hydrogen atoms.

Hydrogen clays are prepared according to my invention by treating clay with a dilute mineral acid in an organic solvent. The hydrogen clays can be recovered by filtration and washed with fresh volumes of organic solvent if desired. When necessary, the first stage of acidification and filtration can be followed with one or more additional stages of acidification and filtration, prior to washing to produce a salt free product.

The resultant hydrogen clays are useful as reactive fillers and extenders for polymers or as substrates which are reactive with organic onium compounds to form organoclays. The clays so treated can also be used as improved decolorizing agents for hydrocarbons, catalyst substrates, etc.

Clays comprise hydrous alumino-silicates having a two or three layer crystal lattice. An excess negative charge generally exists interior of the crystal because of inclusion of atoms of various metals such as magnesium, iron, etc. This internal negative charge gives rise, on the clay surface, to sites which attract positively charged ions and which behave as ion-exchange sites. Commonly, clays are found in which these ion-exchange sites are occupied by alkali or alkaline earth metals.

Previous investigators have treated aqueous suspensions of clays with dilute mineral acids to displace the metal ions with a hydrogen ion. Because most clays, particularly the expanding lattice type, form gels in water, they cannot be readily recovered from aqueous suspensions by conventional means such as filtration, sedimentation, etc. If the clay is recovered by evaporating its suspension to dryness, the alkali or alkaline earth metal ions remain with the clay surface as salts of the treating acid. The maximum concentration of clay in aqueous solutions which can be handled and filtered is limited to less than about 10 weight-percent with the swelling clays, since in excess of 10 weight-percent clay, the suspensions are thick gelatinous liquids. This limiting concentration requires the use of large volumes of treating liquid.

It has been suggested that the hydrogen form of clays can also be obtained by contacting an aqueous suspension of the clay with a hydrogen charged ion-exchange resin. The aqueous suspension of hydrogen clay can thereafter be evaporated to dryness, e.g., by spray drying. The gelling tendency of most clays hinders this contacting step and limits the clay concentration in the aqueous suspension which can be treated to less than about 2 weight-percent. The large amounts of water which must subsequently be evaporated makes this technique too expensive for commercial use.

It is an object of this invention to provide a preparation for hydrogen clays.

It is also an object of this invention to obtain hydrogen clays which are substantially free of soluble salts.

Other and related objects will be apparent from the following disclosure.

I have found that hydrogen clays can be obtained in substantially pure form by the treatment of clay with a mixture of a mineral acid in an organic liquid in which the alkali and alkaline earth metal salts of the mineral acid are soluble. The conditions of the acid treatment are mild to preclude any significant dissolution of the aluminum silicate structure. In general, temperatures between about 5 and 100° C. can be used; temperatures between about 15 and about 45° C. are preferred. The amount of acid used in the acid-organic liquid treating mixture is between about 0.5 and 10; preferably between about 1 and 5; milliequivalents per milliequivalent of base exchange capacity of the clay. At these conditions, the aluminum silicate structure (infrared and X-ray diffraction patterns) is not measurably affected by the treatment.

Because the hydrogen clay does not swell to a substantial degree in the organic medium, it can readily be recovered therefrom by conventional means such as filtration, centrifugation, sedimentation, etc. The separated solid can thereafter be washed with fresh volumes of organic medium to remove soluble salts. If desired, the first step of acidification and recovery from the suspending medium can be followed by one or more additional acidifications and recoveries to remove the last traces of exchangeable alkali or alkaline earth metal ions prior to washing to remove soluble salts and excess acid.

My invention can be employed to obtain the hydrogen form of most clays and is not limited in scope in this regard. In general, clays of the halloysite, illite, kaolinite, montmorillonite, polygorskite groups and various unclassified clays can be readily converted to their hydrogen form by my invention.

Members of the halloysite group conform to the general formula $Al_2Si_2O_5(OH)_4$ and include: allophane, endellite, halloysite, indianite, metahalloysite, schrotterite, etc.

Members of the illite group have a composition expressable as $(OH)_4K_y(Al_4 \cdot Fe_4 \cdot Mg_4 \cdot Mg_6)(Si_{8-y} \cdot Al_y)O_{20}$. Examples are brammallite, bravaisite, glimmerton, hydromica, sericite, etc.

Kaolinite has a general formula of $Al_2O_3 \cdot 2SiO_2 \cdot 2H_2O$ and is commonly found with other members of the kaolinite group including: anauxite or ionite, collyrite, dickite, ferrikaolinite, nacrite, neokaolin, metakaolin, metanacrite, severite, etc.

The montmorillonite group includes the following: "Amargosite" beidellite, bentonite, chloropal, erinite, ferromontmorillonite, hectorite, metabentonite, montmorillonite, nontronite, otaylite, saponite, etc.

The palygorskite group includes the following clays: attapulgite, calciopalygorskite, lasallite, palygorskite, paramontmorillonite, parasepiolite, sepiolite, etc.

Various unclassified clays which can be treated are: faratsihite, glacialite, grundite, potash montmorillonite, potash bentonite, ptilolite, sericite, muscovite, etc.

Any of the aforementioned clay minerals can be treated with a mineral acid-organic medium in accordance with my invention to yield a hydrogen clay having a low salt content.

As previously mentioned, the organic medium comprises an inert organic liquid in which the alkali and alkaline earth metal salts of the treating acid are soluble. Oxygenated organic solvents can be used such as the mono- and dihydric alcohols of low molecular weight, e.g., methanol, ethanol, propanol, isopropanol, butanol, isobutanol, pentanol, isopentanol, ethylene glycol, ketones, e.g., acetone, methyl enthyl ketone, etc.; dioxane, etc. In general, suitable organic solvents are those which will dissolve at least about 0.1 weight-percent; preferably at least 1.0 weight-percent of the alkali or alkaline earth metal salts of the treating acid. It is of course apparent that the greater the salts' solubility in the organic solvent, the less solvent and/or the fewer stages of washing will be necessary. The preferred organic solvent is methanol.

The treating acid to be used is a mineral acid such as sulfuric, nitric, or a hydrogen halide, e.g., hydrochloric, hydrobromic or hydrofluoric acid. Of these, I prefer to use hydrochloric acid because of the greater solubility of alkali and alkaline earth metal chlorides in the aforementioned organic solvents. These acids, having concentrations between about 10 and 90 weight-percent in water, are admixed with the organic medium, in amounts between about 0.01 and about 4 parts of acid per part of organic medium. The amount of acid employed is generally between about 1 to 10 times the stoichiometric amount to react with the clay; i.e., from 1 to 10 times milliequivalents of acid as milliequivalents of base exchange capacity of the clay. In general, the proportions of acid and organic medium and the concentration of the acid should be such that the water content of the treating mixture does not exceed about 25 weight-percent and preferably is between about 2 and about 5 weight-percent.

The admixture of organic solvent and acid are thereafter reacted with the desired clay. Generally, the clay so treated can have particle sizes ranging from individual platelet sizes of several Angstrom units to about 0.05 inch; however, for most uses, finely divided clay having an average particle diameter less than about 10 microns is preferred. Most of the aforementioned clays are commercially available in this size range; if not, they can readily be prepared by crushing the coarser materials in suitable means, for example, a ball mill, and screening or classifying the crushed material to segregate the desired size fraction.

The clay is admixed with the organic medium-acid mixture in amounts between about 0.1 and about 0.5 parts per part by weight of said mixture. To reduce the volume of medium employed, the higher concentrations can be used; between about 0.3 and 0.5 parts per part of liquid.

My invention will now be described by reference to the figure which presents a typical flow plan of the process.

A clay, e.g., Wyoming bentonite having a broad range of particle sizes is admixed with an organic medium and a mineral acid in mixing vessel 1 to form to suspension of clay in the organic-acid liquid. Preferably, the organic medium is methanol and the acid is hydrochloric. The preferred amounts in the mixture are about 100–300 parts of clay; 200–800 parts of methanol and 10–50 parts of hydrochloric acid having a concentration between about 10 and 90 percent. The displacement of the naturally occurring cations by hydrogen ions readily occurs at ambient temperatures and, therefore, vessel 1 need not be heated, although elevated temperatures, e.g., 25 to 90° C. can be used if desired. The contents of vessel 1 are agitated by propeller 30 so as to form a suspension of clay in the organic medium. It is of course apparent that other techniques can be used, e.g., the materials can also be blended into a suspension by passage through a colloid mill, centrifugal pump, etc.

Coarse sand, silt and large clay particles settle to the bottom of vessel 1 and can be removed therefrom through line 2. In a preferred embodiment, the resulting suspension of hydrogen clay is elutriated in column 3 to reject the coarse clay particles and recover the finest 10–70 weight-percent fraction for further processing. It is of course apparent that this elutriation step could be performed prior to addition of the clay to vessel 1 so as to reduce the acid requirements of the process. In any event, the velocity of the suspension in column 3 can be readily controlled by the addition of added volumes of solvent through line 35 when necessary so as to obtain a suspension of hydrogen clay having the desired degree of fineness in the manner apparent to those skilled in the art.

The hydrogen clay suspension withdrawn at 4 comprises the desired size fraction and is passed into a tank 5 which contains a rotary filter 6 and scraper 7. Filtration of the hydrogen clay from the treating liquid can be performed in tank 5 at any desired temperature up to the boiling point of the organic medium. Generally, temperatures between about 5° and about 100° C. can be used; preferably ambient temperatures, between about 10° and about 30° C. are employed. The temperature can be readily controlled in tank 5 by heat release to or heat removal from the organic solvent in heat exchangers 19 and 32.

The organic liquid is withdrawn through the filter drum 6 and line 8 for processing in the solvent recovery unit 39. A pump in line 8, or as illustrated, a blower 34, maintains a vacuum in the filters. The hydrogen clay which is deposited on the filter drum is removed therefrom by scraper 7 and is discharged into chamber 9. In this chamber, fresh volumes of organic solvent are added to the solid and the admixture is agitated by a mixer 10 to suspend the clay. The suspension overflows into chamber 11 which contains a second rotary filter 12 and scraper 13. The organic solvent is removed at line 14 and is combined with the solvent in line 8 for recovery. The washed and filtered hydrogen clay is removed by scraper 13 and is discharged into chamber 16. In chamber 16, the clay is again suspended in fresh volumes of solvent from line 31 and the suspension formed by mixer 15 overflows into a final filter unit 17. The organic solvent removed by line 18 from this last filter stage is combined with that in line 8 and passes to the solvent recovery unit.

The volumes of wash solvent introduced into tank 5 through lines 18 and 31 can be widely varied to obtain the desired purity of hydrogen clay. In general, between about 0.5 and about 10 parts of solvent can be introduced per part by weight of clay to be filtered, preferably between about 2 and about 4 parts are used. Although two wash stages are illustrated, it is of course apparent that more or lesser stages of washing and/or acidification can be employed as are necessary to reduce the soluble salt and exchangeable ion content of the clay to the necessary degree.

The filtered and washed hydrogen clay is then transferred to a drier 20 which can be a heated oven, rotary kiln or other art-recognized unit operation for drying of solids. As illustrated, a conveyor 22 is employed to move the clay through the oven. A drying gas, e.g., dehumidified air is introduced by blower 23 and the oven can be heated by element 21. In general, the temperature in oven 20 is maintained at a temperature below 200° C., preferably less than about 120° C. The oven gases are discharged at 24 and are passed to a solvent recovery means, e.g., tower 25 which can contain a cooling coil or coalescing spray to condense volatilized solvent. If desired, the solvent can be recovered by absorption with a lean absorbent introduced at 26 to yield a fat oil which is removed at 27 and which can be passed to the solvent recovery unit 39. The stripped gases are exhausted at 28.

Agglomerates of the dried hydrogen clay can be crushed by any suitable means, e.g., grinder 28, a ball mill, etc. The recovered product has a low salt content and has its base exchange sites occupied by hydrogen ions. Aqueous suspensions of the clay will exhibit acid properties and have pH values which are dependent on the base exchange capacity of the clay. Clays having pH values as low as about 2.0 can be obtained from bentonites, hectorites and montmorillonites having base exchange capacities of between about 50 and about 200 milliequivalents per 100 grams. The amount of exchangeable ions remaining on the clay is entirely a function of the degree of acidification. To illustrate, a bentonite, having 1.9 weight-percent sodium (as $Na_2O$), was treated in accordance with my invention by suspending 200 grams of the clay in 500 milliliters of methanol containing 20 milliliters of 38 percent hydrochloride acid. The suspension was filtered and the solid suspended in 500 milliliters of fresh methanol and again filtered. After the third such washing, the filtered clay had a sodium content (as $Na_2O$) of 0.52 percent. An aqueous suspension of this clay had a pH of 2.75. The clay was again acidified with the same amount of acid-methanol mixture, washed three times to yield a clay having a pH of 2.62 and a sodium content of 0.37 weight-percent. After five acidifications, each followed by three wash steps the sodium content of the clay was reduced to 0.35 percent as $Na_2O$.

The preceding discussion is intended to illustrate my preferred method for preparing hydrogen clays. My invention is not to be unduly limited by the preceding, but is intended to be defined by the method steps and equivalents thereof set forth in the following claims:

I claim:

1. The preparation of a hydrogen clay from a clay having its ion-exchange sites occupied by alkali metal and alkaline earth metal cations that comprises:
    (a) contacting said clay with a liquid medium comprising a mineral acid, an organic solvent and less than 25 percent water; said mineral acid being selected from the class consisting of hydro-halogen acids, sulfuric acid, nitric acid and mixtures thereof and comprising between about 0.01 and 4 volumes per volume of said organic solvent; said organic solvent being an organic liquid in which the alkali metal and alkaline earth metal salts of said mineral acid are soluble;
    (b) the amount of said liquid reaction medium so contacted with said clay being sufficient to provide between about 1 and 10 equivalent weights of said acid per equivalent base exchange-capacity of said clay; and
    (c) thereafter separating said reaction medium as a liquid from said clay to remove said alkali metal and alkaline earth metal cations from said clay and to prepare said hydrogen clay.

2. The method of preparing a hydrogen montmorillonite which comprises:
    (a) suspending between about 0.1 and about 0.5 parts of montmorillonite in each part by weight of an acidification medium comprising a mineral acid, an organic solvent in which the alkali and alkaline earth metal salts of the mineral acid are soluble in amounts greater than about 0.1 weight percent, and less than 25 percent by weight water; said mineral acid being selected from the group consisting of hydro-halogen acids, sulfuric acid, nitric acid and mixtures thereof and comprising between about 0.01 and 4 times the volume of said solvent; and
    (b) separating the solvent in liquid phase and containing the alkali and alkaline earth metal salts of the mineral acid dissolved therein from said clay to produce said hydrogen clay.

3. The method of claim 1 wherein said clay is filtered from said medium liquid and the solid clay thereafter washed with between about 0.5 and 10 parts of said organic solvent per part by weight of clay.

4. The method of claim 2 wherein said hydrogen montmorillonite is washed with between about 0.5 and about 10 parts of said organic solvent per part by weight of clay.

5. The method of claim 2 wherein said hydrogen montmorillonite is again treated with an equal volume of said acidification medium.

6. The method of claim 1 wherein the clay is an expanding lattice clay which forms a gel in water and wherein the reaction medium contains insufficient water to cause the clay to gel.

7. The method of claim 1 wherein water is present in the reaction medium in amounts from 2 to 5 weight percent.

8. The method of claim 1 wherein the mineral acid is hydrochloric acid.

References Cited by the Examiner

UNITED STATES PATENTS

| | | | |
|---|---|---|---|
| 2,553,239 | 5/51 | Christiansen | 252—450 |
| 2,934,504 | 4/60 | Talvenheimo | 252—450 |
| 2,988,519 | 6/61 | Robison et al. | 252—450 |

MAURICE A. BRINDISI, *Primary Examiner.*